United States Patent [19]
Pattanaik

[11] Patent Number: 5,530,604
[45] Date of Patent: Jun. 25, 1996

[54] ELECTRICAL CONNECTION AND SLIDER-SUSPENSION ASSEMBLY HAVING AN IMPROVED ELECTRICAL CONNECTION

[75] Inventor: Surya Pattanaik, San Jose, Calif.

[73] Assignee: International Business Machines Corporation, Armonk, N.Y.

[21] Appl. No.: 246,052

[22] Filed: May 19, 1994

[51] Int. Cl.$^6$ ...................................................... G11B 5/48
[52] U.S. Cl. ............................................................ 360/104
[58] Field of Search ................................ 360/104, 97.01, 360/97.02

[56]  References Cited

U.S. PATENT DOCUMENTS

| | | | |
|---|---|---|---|
| 4,752,027 | 6/1988 | Gschwend | 228/180.2 |
| 4,761,699 | 8/1988 | Ainslie et al. | |
| 5,167,361 | 12/1992 | Liebman | 228/180.2 |
| 5,415,944 | 5/1995 | Kazem-Goudarzi | 428/567 |

FOREIGN PATENT DOCUMENTS

| | | |
|---|---|---|
| 56-111234 | 9/1981 | Japan . |
| 1028931 | 1/1989 | Japan . |

OTHER PUBLICATIONS

"Combination Suspension–Lead Cable for a Multi-Gap Read/Write Head", IBM Technical Disclosure Bulletin, vol. 22, No. 4, New York, U.S., Sep., 1979, pp. 1602–1603.

"Method for Slider Attachment and Head Termination to a Suspension in a Disk File", IBM Technical Disclosure Bulletin, vol. 36, No. 02, New York, U.S., Feb., 1993, p. 371.

*Primary Examiner*—A. J. Heinz
*Attorney, Agent, or Firm*—Douglas R. Millett; Craig J. Yudell; Andrew J. Dillon

[57]  ABSTRACT

A method for the fabrication of a data recording disk file slider-suspension assembly, the slider being of the type having an air bearing surface, a back side opposite the air bearing surface and a trailing edge having a read or write transducer formed as a thin film thereon with electrical leads formed solely on the trailing edge and terminating adjacent the slider back side at termination pads, and a suspension having etched conductive lead structures and conductive contact pads connected to the lead structures. The method comprising the steps of forming a solder bump on each of the termination pads and each of the contact pads, wherein one or more solder bumps are selectively flattened, mechanically attaching the back side of the slider to the suspension such that the termination pads are properly aligned with the contact pads, and heating the solder bumps so as to reflow the termination pad and contact pad bumps such that they electrically connect, wherein a selectively flattened bump extends along an axis defined by a point on one pad and a point on another pad when heated to make contact with another bump.

23 Claims, 8 Drawing Sheets

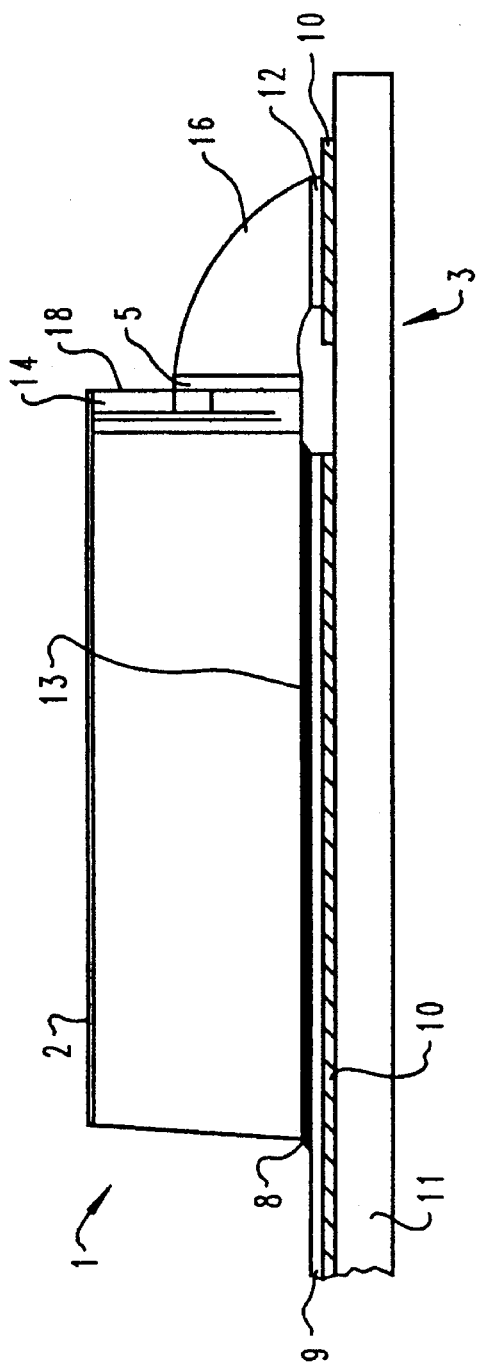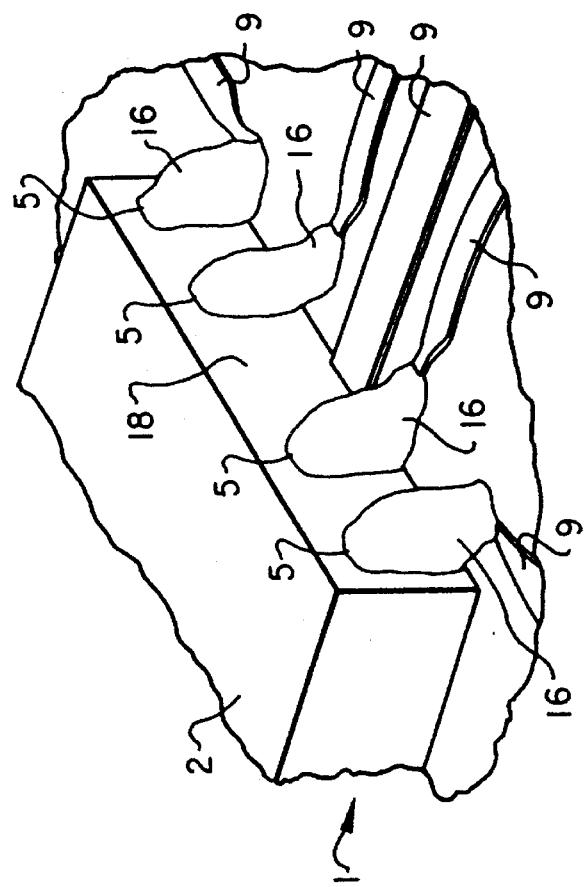
Fig. 4
Fig. 5

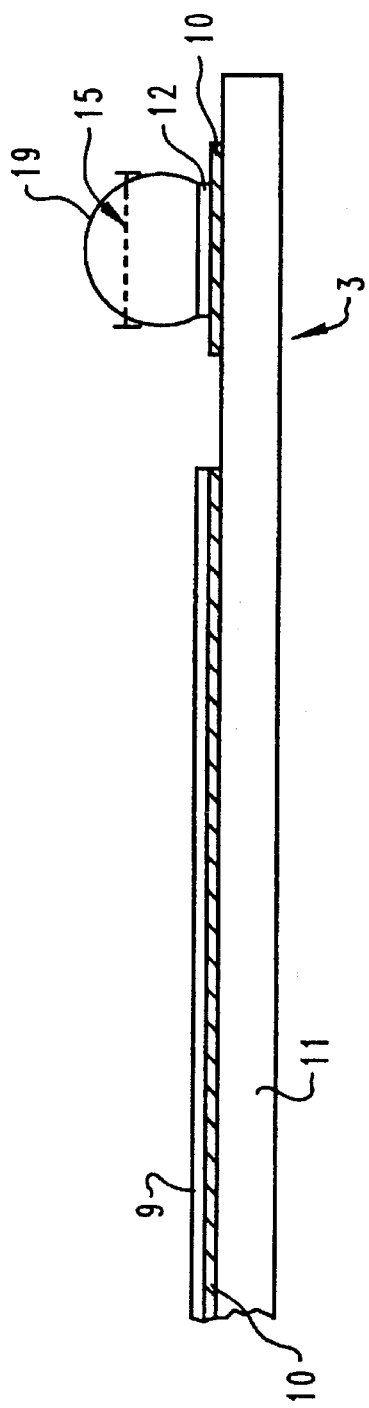
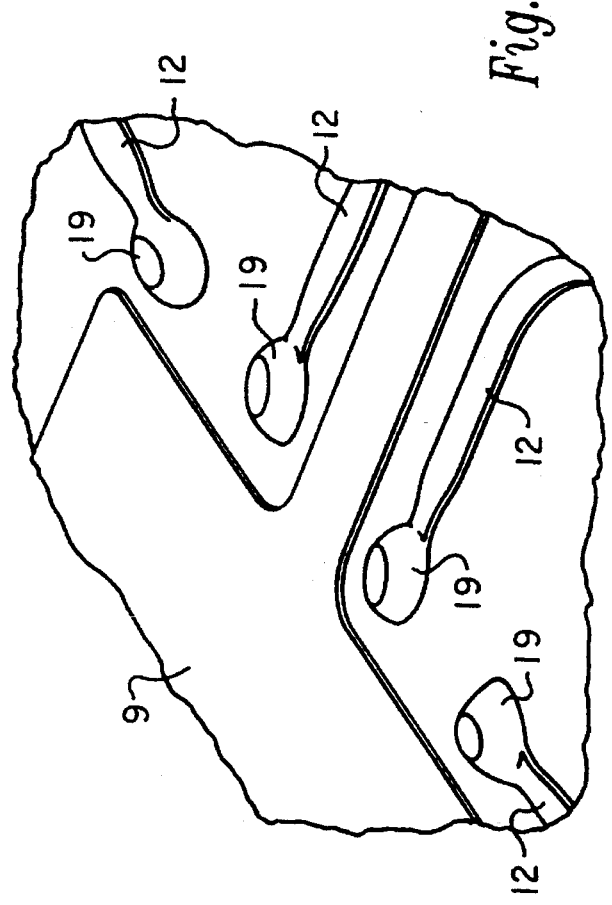

ELECTRICAL CONNECTION AND SLIDER-SUSPENSION ASSEMBLY HAVING AN IMPROVED ELECTRICAL CONNECTION

BACKGROUND OF THE INVENTION

1. Technical Field

This invention relates to slider-suspension assemblies for data recording information storage systems and to a method for making such assemblies. In particular, the invention relates to an improved slider-suspension assembly for a magnetic storage system and a method for electrically connecting the slider to the suspension.

2. Description of the Related Art

Information storage devices, which include magnetic storage devices and optical data storage systems, utilize at least one rotatable disk with concentric data tracks containing the information, a transducer for reading data from or writing data to the various tracks, and a head positioning actuator connected to a head for moving it to the desired track and maintaining it over the track centerline during read or write operations. The transducer is attached to a head (or "slider") having an air bearing surface which is supported adjacent the data surface of the disk by a cushion of air generated by the rotating disk. The slider is attached on its back side (the side opposite the air bearing surface) to the suspension, and the suspension is attached to an actuator arm of the head positioning actuator.

The suspension provides dimensional stability between the slider and actuator arm, controlled flexibility in pitch and roll motion of the slider relative to its direction of motion on the rotating disk, and resistance to yaw (radial) motion. The suspension typically provides a load or force against the slider which is compensated by the force of the air bearing between the slider's air bearing surface and the disk surface. Thus, the slider is maintained in extremely close proximity to, but out of contact with, the data surface of the disk. The suspension typically comprises a load beam, which is mounted at one end to the actuator arm, and a flexure element which is attached to the other end of the load beam and supports the slider. The load beam provides the resilient spring action which biases the slider toward the surface of the disk, while the flexure provides flexibility for the slider as the slider rides on the cushion of air between the air bearing surface and the rotating disk. Such a suspension is described in U.S. Pat. No. 4,167,765, which is assigned to the same assignee as this application. An example of a conventional slider is described in U.S. Pat. No. 3,823,416, which is assigned to the same assignee as this application.

In the conventional slider-suspension assemblies, the slider is mechanically attached to the flexure of the suspension by epoxy bonding. The electrical connection between the transducer and the disk drive read/write electronics is made by twisted wires which run the length of the suspension load beam and extend over the flexure and slider. The ends of the wires are ultrasonically bonded to the transducer leads on the slider. The fabrication of such a slider-suspension requires manual assembly and is thus time consuming and costly.

Another type of suspension is a composite or laminated structure comprising a base layer, a patterned conductive layer with patterned electrical leads formed thereon, and an insulating layer in between, as described in IBM Technical Disclosure Bulletin, Vol. 22, No. 4 (September, 1979), pp. 1602–1603. In this laminated suspension, the slider is epoxy bonded to the laminated suspension and the transducer leads are soldered to the electrical leads formed on the suspension.

Another laminated structure type of suspension is comprised of a base layer of stainless-steel, an insulating layer of polyimide formed on the base layer, and a patterned conductive layer of etched copper alloy formed on the insulating layer, as described in U.S. Pat. No. 4,996,623. The etched copper layer provides a lead structure electrically connecting the thin-film magnetic head transducer and the disk drive's read/write electronics. A method for attaching a slider to a laminated/etched suspension in a data recording disk file has been described in U.S. Pat. No. 4,761,699 and IBM Technical Disclosure Bulletin, Vol. 36, No. 2, February, 1993, p. 371.

There are several disadvantages associated with the slider-suspension assembly process described in U.S. Pat. No. 4,761,699. In order to carry out the process, the etched flat cable on the suspension must undergo further processing to have an insulating passivation layer formed on the cable to prevent shorting between the slider and the cable. Vias must be opened through the passivation layer in order to make electrical contacts with the slider, and solder bumps must be reflowed both for mechanical as well as electrical termination. The slider must also undergo vacuum processing to provide solderable metallized contact pads on the back side of the slider for mechanical attachment. Moreover, the head-suspension assembly must be heated in an infrared belt furnace for reflow of the solder bumps which subjects the slider and MR head to high temperatures. Such a reflow also requires some kind of flux which might induce corrosion on the MR head. An additional step is required to clean off the flux subsequent to the reflow. Additionally, this process is batch type and is not Continuous Flow Manufacturing (CFM) or automated assembly line compatible.

The process described in IBM Technical Disclosure Bulletin, Vol. 36, No. 2, February, 1993, p. 371, uses epoxy for mechanical attachment of the slider. The ends of the copper alloy leads of the suspension are bent up from the surface of the suspension and soldered to the head termination pads using the batch type reflow process. This process brings in a tooling complexity to hold the leads against the solder pads on the slider during the reflow process. In addition, this process has the disadvantages associated with a batch type reflow process as described above.

It would be desirable to provide a method for the fabrication of a data recording disk drive slider-suspension assembly that allows for some tolerance in the alignment of the slider to the suspension when it is mechanically attached, while providing a simple and effective method of electrical connection between the thin-film magnetic head transducer and the suspension leads. It would further be desirable to provide a method of soldering the transducer termination pads to the lead pads of an etched copper cable by a process without the use of flux and the need for subsequent cleaning. It would be still further desirable to provide a method of soldering the transducer termination pads to the lead pads of an etched copper cable by a process such that the head and the suspension are not subjected to heat exposure, thus preventing high temperature exposure and magnetic degradation to temperature sensitive components like an MR head. It would be still further desirable to provide a process for suspension lead and head termination pad connection that does not require a furnace reflow process, thus making the process CFM compatible.

SUMMARY OF THE INVENTION

It is therefore one aspect of the present invention to provide a method for the fabrication of a data recording disk drive slider-suspension assembly that allows for some tolerance in the alignment of the slider to the suspension when it is mechanically attached, while providing a simple and effective method of electrical connection between the thin-film magnetic head transducer and the suspension leads.

It is another aspect of the present invention to provide a method of soldering the transducer termination pads to the lead pads of an etched copper cable by a process without the use of flux and the need for subsequent cleaning.

It is yet another aspect of the present invention to provide a method of soldering the transducer termination pads to the lead pads of an etched copper cable by a process such that the head and the suspension are not subjected to heat exposure, thus preventing high temperature exposure and magnetic degradation to temperature sensitive components like an MR head.

It is still yet another aspect of the present invention to provide a process for suspension lead and head termination pad connection that does not require a furnace reflow process, thus making the process CFM compatible.

According to the present invention, a method for the fabrication of a data recording disk drive slider-suspension assembly is provided. The slider being of the type having an air bearing surface, a back side opposite the air bearing surface and a trailing edge having a read or write transducer formed as a thin film thereon with electrical leads formed solely on the trailing edge and terminating adjacent the slider back side at termination pads. The suspension having etched conductive lead structures and conductive contact pads connected to the lead structures. The method comprising the steps of forming a solder bump on each of the termination pads and each of the contact pads, wherein one or more solder bumps are selectively flattened, mechanically attaching the back side of the slider to the suspension such that the termination pads are properly aligned with the contact pads, and heating the solder bumps so as to reflow the termination pad and contact pad bumps such that they electrically connect, wherein a selectively flattened bump expands radially in a direction to make contact with another bump upon heating.

According to the present invention, a slider-suspension assembly for a magnetic storage system is provided. The slider-suspension assembly comprises a slider having an air bearing surface, a back side opposite the air bearing surface and a trailing edge oriented generally perpendicular to the back side and the air bearing surface. Also, a thin-film transducer formed on the trailing edge of the slider and having electrical leads terminating at termination pads located on the trailing edge, a suspension having a conductive lead structure including contact pads, the back side of the slider being mechanically attached such that the contact pads are aligned with the termination pads. A plurality of right angled solder fillet joints are electrically connecting the contact pads to the termination pads, each fillet being formed by heating two adjacent solder bumps formed on pads so as to reflow the two solder bumps together to create an electrical connection, one bump being attached to a termination pad and the other being attached to a contact pad, wherein one or both solder bumps are selectively flattened such that it is not formed in the natural hemispherical shape that the solder bump would attain if liquefied, and such that the bump will expand radially in all directions when returning to its natural hemispherical shape upon reflow, whereupon heating, one or more bumps expand in a direction to make contact with another bump.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 depicts the slider end of the slider-suspension assembly of the present invention;

FIG. 5 depicts a perspective view of the slider-suspension assembly according to the present invention;

FIG. 8 depicts a laminated suspension having a flattened solder bump according to the present invention;

FIG. 9 depicts a perspective view of a laminated suspension having selectively flattened solder bumps according to the present invention;

DETAILED DESCRIPTION OF PREFERRED EMBODIMENT

Figure 1:
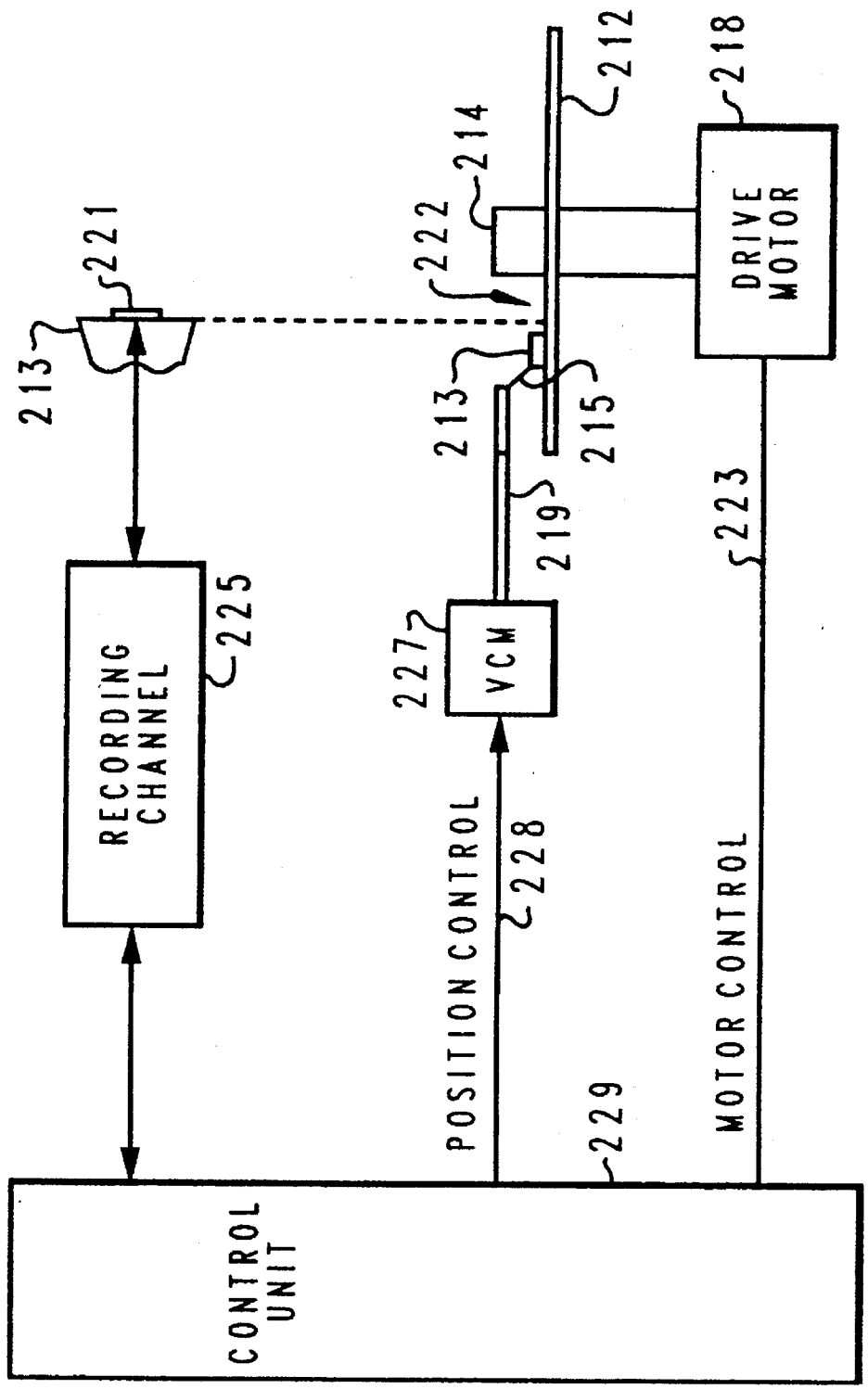
FIG. 1 depicts a magnetic disk storage system.

Although the present invention is described as embodied in a magnetic disk storage system as shown in FIG. 1, it will be apparent that the invention is also applicable to other information storage systems such as an optical data storage system or a magnetic tape recording system, for example. At least one rotatable magnetic disk 212 is supported on a spindle 214 and rotated by a disk drive motor 218. The magnetic recording media on each disk is in the form of an annular pattern of concentric data tracks (not shown) on disk 212.

At least one slider 213 is positioned on the disk 212, each slider 213 is supporting one or more magnetic read/write heads 221. As the disks rotate, the sliders 213 are moved radially in and out so that the heads 221 may access different portions of the disk surface 222 containing the data. Each slider 213 is attached to an actuator arm 219 by means of a suspension 215. The suspension 215 provides a slight spring force which biases the slider 213 against the disk surface 222. Each actuator arm 219 is attached to an actuator means 227. The actuator means shown in FIG. 1 is a voice coil motor (VCM), but it may also be a stepper motor. The VCM is a coil moveable within a fixed magnetic field, and the direction and velocity of the coil movements is controlled by the current supplied.

During operation of the disk storage system, the rotation of the disk 212 generates an air bearing between the slider 213 and the disk surface 222. The air bearing thus counterbalances the slight spring force of the suspension 215 and supports the slider 213 off the disk surface by a small, substantially constant spacing during operation. Although an air bearing is described with the preferred embodiment, any fluid bearing may be used including an oil lubricant.

The various components of the disk storage system are controlled in operation by signals generated by control (read/write electronics) unit 229, such as access control signals and internal clock signals, and which includes logic control circuits, storage means and a microprocessor. The control unit 229 generates control signals to control various system operations such as motor control signals on line 223 and head position control signals on line 228. The control signals on line 228 provide the desired current profiles to optimally move and position a selected slider 213 to the desired data track on the associated disk 212. Read and write signals are communicated to and from read/write heads 221 by means of recording channel 225, which includes conductor lines running along suspension 215 and actuator arm 219.

Figure 2:
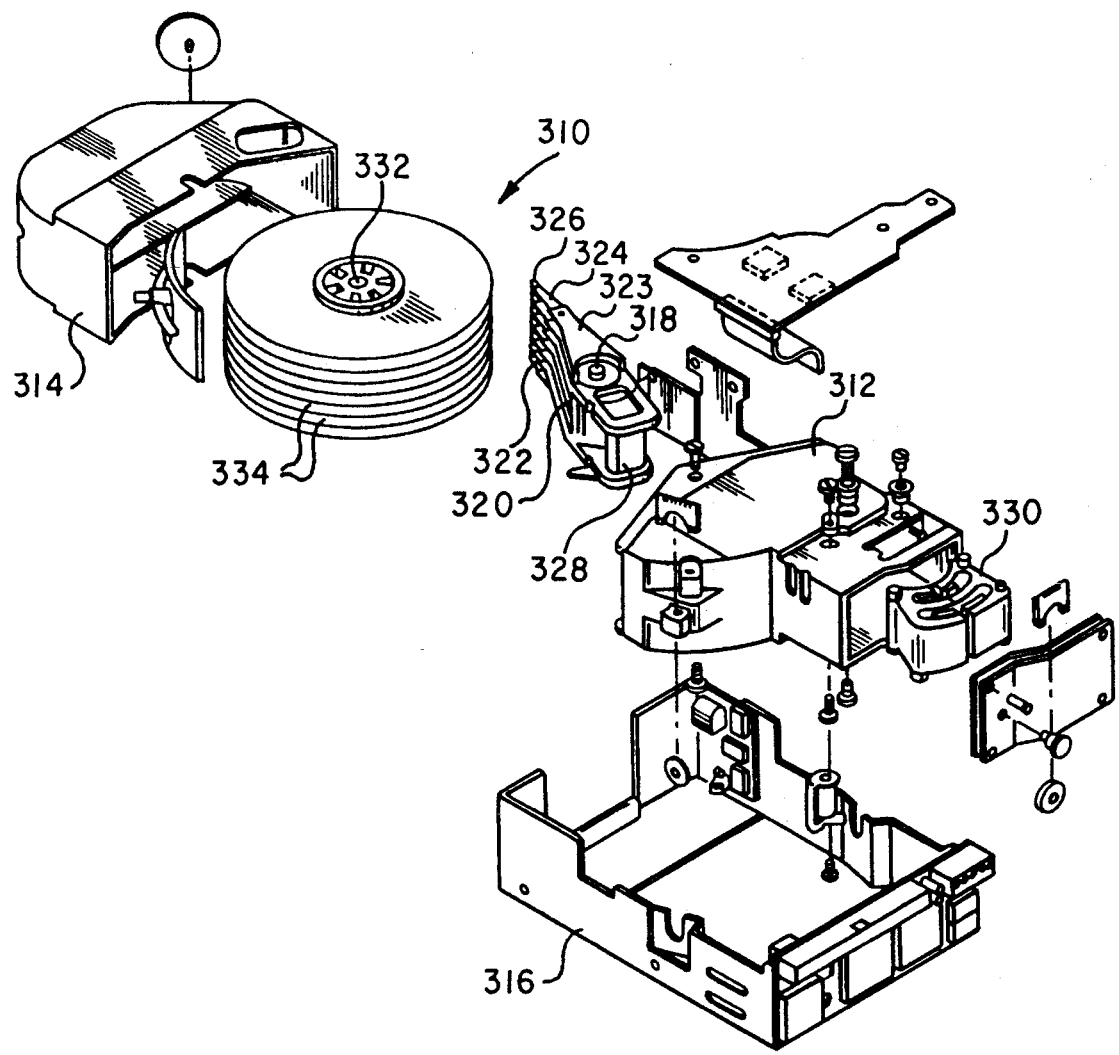
FIG. 2 depicts an exploded view of a disk drive.

The above description of a typical magnetic disk storage system, and the accompanying illustration of it in FIG. 1 are for representation purposes only. The invention described in this application is useful with all mechanical configurations of magnetic storage system disk drives or direct access storage devices ("DASD"). It should be apparent that disk storage systems may contain a large number of disks and actuators, and each actuator may support a number of sliders. For example, FIG. 2 is an exploded view of a disk drive 310. It should be noted that although a rotary actuator is shown the invention described herein is also applicable to linear actuators. The disk drive 310 includes a housing 312, and a housing cover 314 which, after assembly, is mounted within a frame 316. Rotatably attached within the housing 312 on an actuator shaft 318 is an actuator arm assembly 320. One end of the actuator arm assembly 320 includes an E block or comb like structure 322 having a plurality of actuator arms 323. Attached to the separate arms 323 on the comb or E block 322 are spring suspensions 324. Attached at the end of each spring suspension is a slider 326 which carries a magnetic transducer (not shown in FIG. 2). On the other end of the actuator arm assembly 320 opposite the spring suspensions 324 and the sliders 326 is a voice coil 328.

Attached within the housing 312 is a pair of magnets 330. The pair of magnets 330 and the voice coil 328 are key parts of a voice coil motor which applies a force to the actuator assembly 320 to rotate it about the actuator shaft 318. Also mounted within the housing 312 is a spindle shaft 332. Rotatably attached to the spindle shaft 332 are a number of disks 334. In FIG. 2 eight disks are attached to the spindle shaft 332. The disks 334 are attached to the spindle shaft 332 in spaced apart relation.

The present invention is an information storage system with an improved slider-suspension assembly. For an example of a prior art subassembly, see FIG. 3. The suspension comprises a load beam 100 and a flexure 120 located at the end of load beam 100. The suspension is attached to the disk file actuator arm (not shown) by means of a mounting plate 140. The slider 160 is a conventional slider formed of ceramic material, such as a mixture of alumina ($Al_2O_3$) and titanium carbide (TiC). The slider 160 has an air bearing surface 180, which includes two rails 120, 122, a back side 124 opposite and generally parallel to air bearing surface 180, a leading edge 125 and a trailing edge 126, both of which form end faces oriented generally perpendicular to air bearing surface 180 and back side 124. Slider 160 is secured to flexure 120 by an epoxy bond between back side 124 and flexure 120.

Located on the trailing edge 126 of slider 160 are two thin-film read/write transducers 128, 130. Typically, multiple thin-film transducers are formed on a single slider, even though only one transducer is active as a read/write element, in order to improve the yield of the slider during the thin-film fabrication process. The transducers 128, 130 have pole tips 1 131, respectively, which extend toward the edge of respective rails 120, 122. Transducer 128 has electrical leads 133, 135 and transducer 130 has electrical leads 137, 139 for connection to the read/write electronics of the disk drive.

Figure 3:
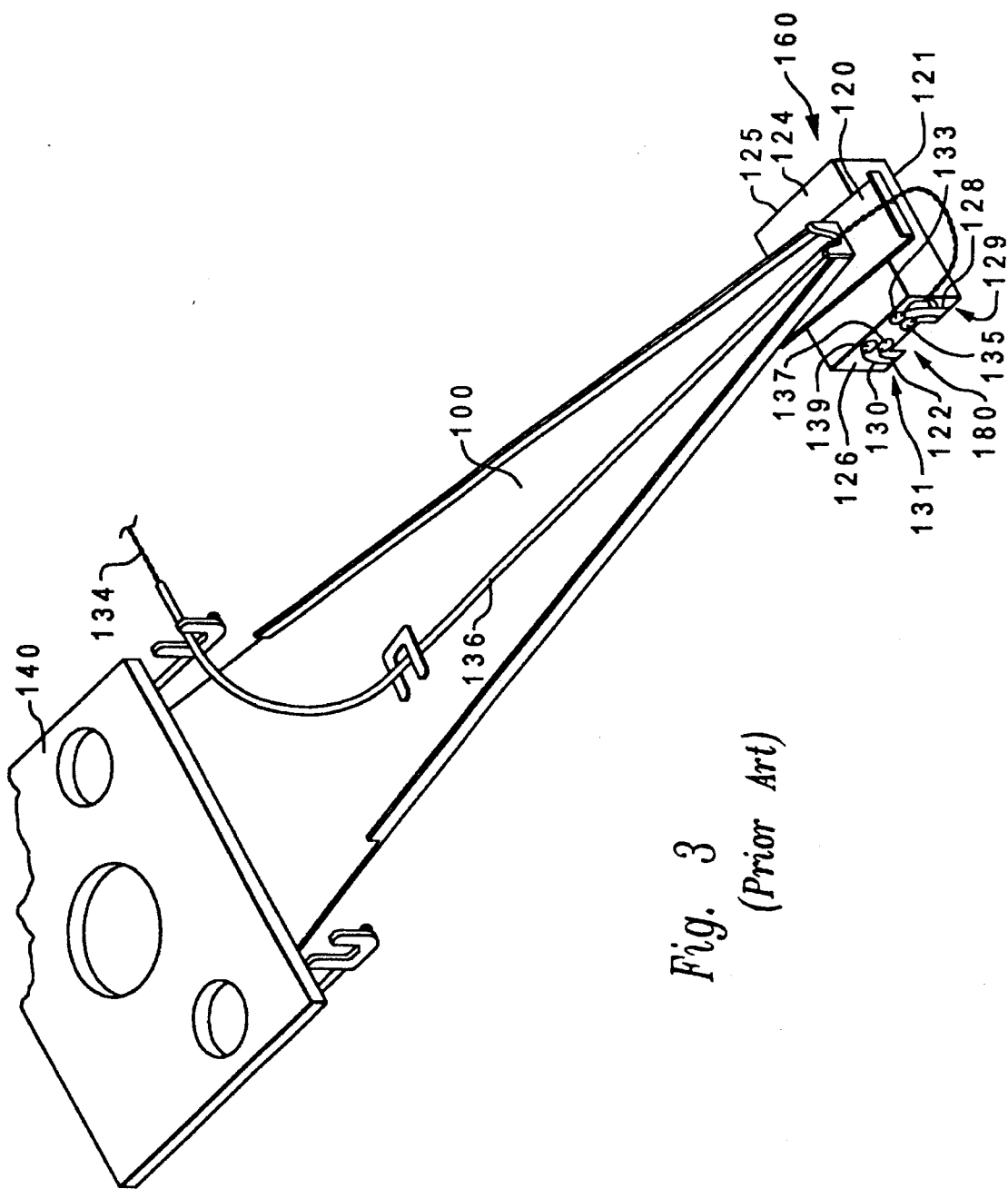
FIG. 3 shows a conventional slider-suspension assembly.

In the prior art suspension shown in FIG. 3, the electrical attachment to the read/write electronics is made by twisted wires 134 which extend from the read/write electronics of the magnetic storage system, through a tube 136 on load beam 100 and out the end of tube 136. The ends of wires 134 are ultrasonically bonded to the leads 133, 135 of active transducer 128. The electrical connection of the transducer 128 by means of the twisted wires 134 is made by manual fabrication.

Referring now to FIG. 4, the slider-suspension assembly a preferred embodiment of the present invention is illustrated where slider 1 is both mechanically and electrically connected to a composite or laminated suspension 3. The suspension 3 comprises a base layer 11, an insulating layer 10 formed on the base layer 11, and a patterned conductive layer 9, 12 formed on the insulating layer 10. The base layer 11 may be a stainless-steel sheet. The insulating layer 10 may be a polyimide layer and the patterned conductive layer 9, 12 may be a copper layer. The back side 13 of slider 1 is mechanically attached to suspension 3. This is accomplished by epoxy adhesive 8 which adheres the back side 13 of slider 1 to suspension 3. Alternatively, the suspension 3 could be formed as a etched flex cable bonded to a stainless steel base layer.

At trailing edge 18 of slider 1, a thin-film transducer 14 is formed. This thin-film transducer may be any type of magnetic transducer including a read/write inductive head, a magneto-resistive (MR) sensor, or an MR head. The pole tips of transducer 14 extend out to the end of the trailing edge 18 where it meets the fluid bearing surface 2, here an air bearing. The conductive leads for transducer 14 terminate at two electrically separate termination pads 5. Termination pads 5 are electrically connected to two contact pads 12 by right angled solder fillet joints 16. Contact pads 12 are part of the conductive lead structure etched into the patterned conductive layer 9, 12. The conductive lead structure contains conductor lines that travel the length of the suspension 3 and make connection to actuator arm-electronics termination pads or an electronics package (not shown in the figure) that delivers signals to the disk drive read/write electronics. Thus, these conductor lines transmit signals generated by the transducer 14 representative of data bits recorded in the magnetic storage medium passing over transducer 14 at air bearing surface 2 to read/write electronics of the magnetic storage system. However, the conventional conductive lead structure of a twisted pair of wires may also be used in the present invention.

Referring now to FIG. 5, there is depicted a perspective view of the slider-suspension assembly according to the present invention. The magnetic transducer has electrical leads formed on the trailing edge 18 and terminating at termination pads 5 that extend down almost to the corner defined by the back side 13 and trailing edge 18. This perspective shows that slider 1 has two thin-film transducers formed on trailing edge 18. Each transducer has two electrical leads that terminate at termination pads 5. Alternatively, the termination pads 5 comprise the four leads of an MR head. Termination pads 5 are connected to the suspension termination pads 12 and conductive lead structure 9 by right angled solder fillet joints 16.

Figure 6:
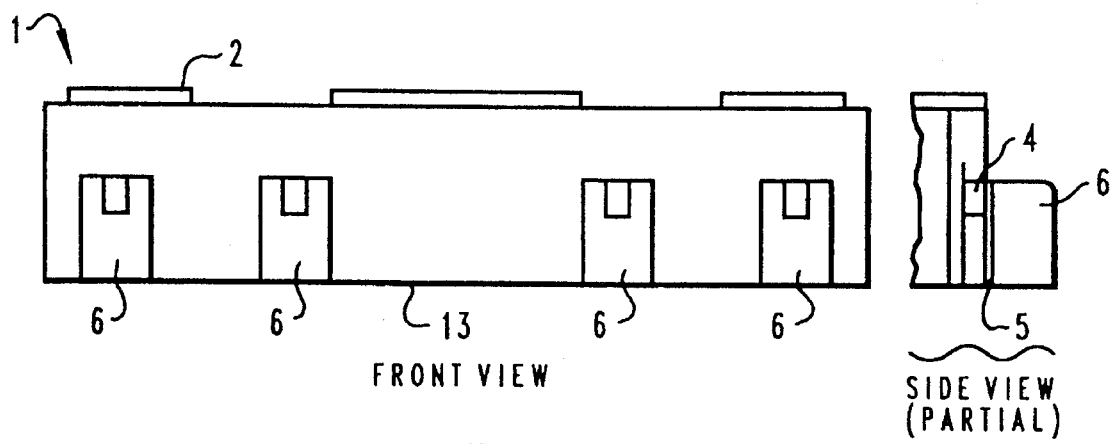
FIG. 6 depicts an elevational front and side view of a slider according to the present invention.

The process of assembling the slider-suspension of the present invention begins with the fabrication of the slider. Referring to FIG. 6, the slider 1 is fabricated using a photolithographic deposition-etching process. The thin-film head is deposited in layers on a wafer formed of a ceramic material, such as a mixture of alumina ($Al_2O_3$) in titanium carbide (TiC). The last two masks used in this photolithographic process are a copper stud plating 4 connected to the transducer conductive leads and then a layer of copper plating which creates termination pads 5. An appropriate seed layer is used between copper and the underlying alumina on the slider to provide improved adhesion. Solder is then applied to each of the termination pads 5. These solder bumps 6 are composed of a solder alloy which have been formed and flattened on the termination pads. The solder bumps extend down to the corner defined by the back side of the slider and the trailing edge. Once the slider is bonded to the suspension, these solder bumps extend up to the suspension surface. Sliders used in the prior art had solder bumps on the transducer's termination pads which were small, of circular cross-section and with rounded tops, for example see U.S. Pat. No. 4,761,699. The present invention provides a slider with solder bumps on the transducer termination pads which are large, of a square or rectangular cross-section and with flattened tops. This can best be seen with reference to FIG. 6 and FIG. 7.

There are several methods of applying the solder. In one method, a 500–1000Å, thick layer of immersion gold is plated over copper termination pads 5. Solder paste, such as a 58% BI-42% SN, or 63% SN-37% PB, or any other solder alloy suitable for this application, is then screened using a screen printer, and the paste reflowed in a multi-zone infrared furnace having a nitrogen atmosphere. The solder flux is then cleaned from the wafer. In another method, the solder is applied to the termination pads 5 by electroplating or vapor deposition, both of which are well known by those skilled in the art.

The bumps created by electroplating or vapor deposition are naturally formed with flattened tops. The solder bumps which have been created by the reflow method are of a round, generally spherical or hemispherical shape. This is due to the natural tendency of the solder to attain a minimum surface energy upon reflow. Thus, while in a liquid state, the solder will form this natural hemispherical, round shape. According to the present invention, after the solder cools to a solid state, these solder bumps are flattened to a desired height by controlled pressure. This may be accomplished by placing the wafer in a mechanical press which physically smashes or deforms the solder bumps 6 until they achieve a desired height above the trailing edge 18. An alternative method of flattening solder bumps 6 is to place weights over solder bump 6 and then reflow the solder. It should be understood that there are many other ways to flatten solder bump 6. Moreover, there are many angles and shapes that solder bumps 6 may retain for practicing the present invention; all that is necessary is for the solder bump to be deformed or flattened such that it does not retain the natural hemispherical reflow shape.

Figure 7:
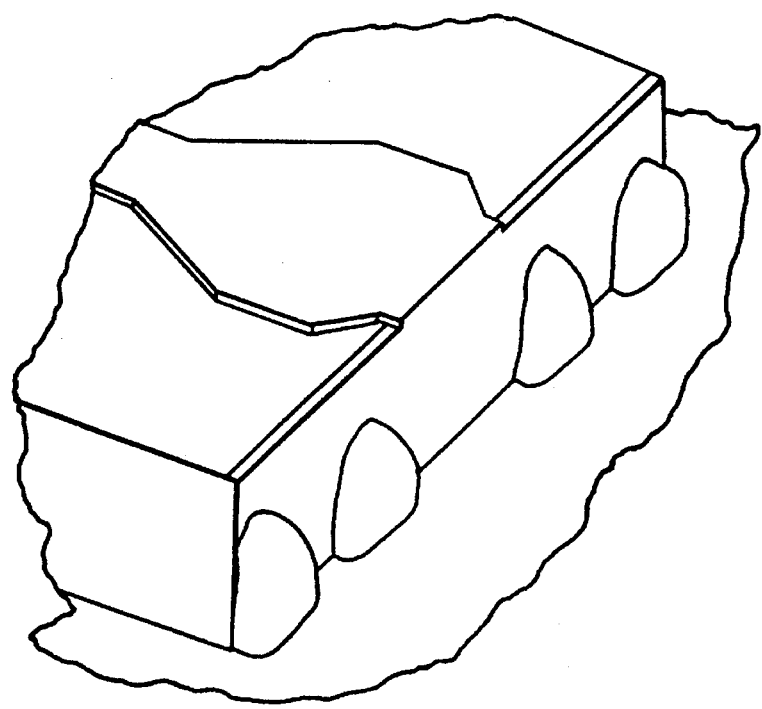
FIG. 7 shows a perspective view of a slider having selectively flattened solder bumps according to the present invention.

FIG. 7 shows a perspective view of a slider with flattened solder bumps on its termination pads, according to the present invention. As shown in the preferred embodiment of FIG. 7, flattening has created solder bump thicknesses, as measured along the axis perpendicular to the trailing edge, that are less than the bump width or length.

The process continues by dicing the wafer in the usual manner to yield sliders. The sliders produced have solder pads with thicknesses between 25 micrometers and 150 micrometers or between 5% to 15% of the width of the slider. The flattened bumps used on the slider of the present invention avoid many of the processing disadvantages associated with the round, hemispherical solder bumps used in the prior art. The flattened bumps provide large surface areas for lapping cable contact and for quasi test probing.

Referring now to FIG. 8, suspension 3 is prepared by forming solder bumps 19 to contact pads 12. These solder bumps may be applied to suspension 3 in the same manner that solder bumps 6 were applied to slider 1. Additionally, solder bumps 19 may be flattened in the same way as solder bump 6, for example by mechanical pressing or by weighted-reflow. A flattened solder bump 19 would have a top surface 15. FIG. 9 shows a perspective view of flattened solder bumps 19 on contact pads 12.

Figure 10:
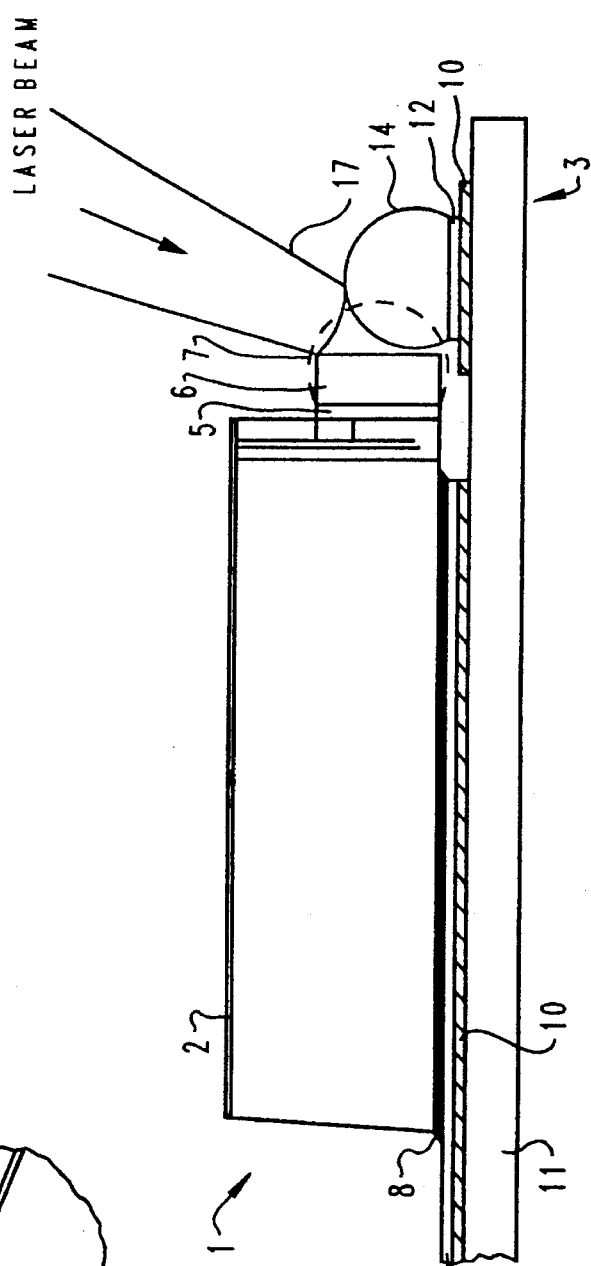
FIG. 10 depicts a process for the assembly of the slider-suspension assembly, according to a preferred embodiment of the present invention.

FIG. 10 depicts a process for assembly of the slider-suspension assembly, according to a preferred embodiment of the present invention. The slider 1 is fabricated with solder bumps 6 formed on each of the termination pads 5 Each of the solder bumps 6 are selectively flattened, wherein a selectively flattened solder bump is defined herein as a solder bump flattened such that it is not formed in the natural hemispherical shape that the solder bump would attain if liquified upon reflow, and such that the surface of the bump will extend or expand (or contract) radially in all directions away from its corresponding pad when returning to its natural hemispherical shape upon reflow. As can be seen in FIG. 10, selectively flattened solder bumps 6 have a maximum dimension along an axis parallel to the surface of the termination pad 5. Thus, selectively flattened solder bump 6 will expand at least in a direction normal to the flattened surface of the bump.

Figure 11:
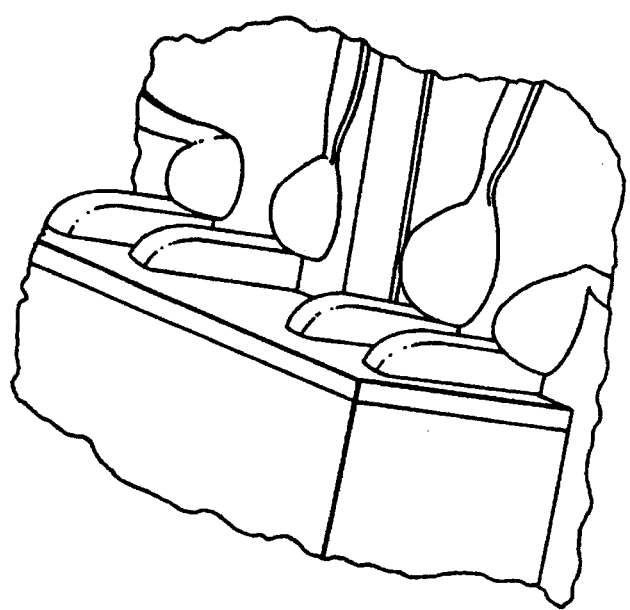
FIG. 11 depicts a perspective view of a slider-suspension assembly during the process of the present invention.

Solder bump 14 is formed on contact pad 12 on the etched copper surface of suspension 3. Slider 1 is aligned atop suspension 3 such that each termination pad 5 along with its corresponding selectively flattened solder bump 6 is properly aligned with the corresponding contact pad 12. Contact pad 12 is designed to act as part of a conductive lead structure that runs along suspension 3 in etched conductive layer 9, 12 for connecting the thin-film transducer termination leads with the read/write electronics of the information storage system. The alignment places termination pad-solder bump 6 adjacent to contact pad-solder bump 14. The back side of slider 1 is mechanically bonded or attached to suspension 3 with epoxy 8. FIG. 11 shows a perspective view of the slider properly aligned to the patterned conductive layer and mechanically attached to the suspension, but prior to the step of heating the solder bumps to reflow them into the right angled solder fillet joints.

Solder bump 6 and solder bump 14 are then heated by laser beam 17, while being flooded by a flow of nitrogen gas. Laser beam 17 is produced from a YAG laser which is focused and shined at the junction of the two adjacent solder bumps 6 and 14. The power applied can vary depending on the volume of the solder bump or the melting point of the solder. Typically, the process will require approximately 400 mJ. If solder bumps 6 and 14 have been aligned such that they are directly in contact or in sufficiently close proximity, the laser beam heating will cause the solder bumps to reflow and make electrical connection. This occurs because solder bump 6 is a selectively flattened solder bump prior to heating by laser beam 17. Upon melting, selectively flattened solder bump 6 will return to its natural hemispherical shape 7 to minimize its surface energy, as can be seen in FIG. 10. As selectively flattened solder bump 6 returns to shape 7, it extends or expands out radially in a direction normal to its flattened surface. This will cause liquid solder bump 6 to literally bump into and make electrical contact with liquid solder bump 14.

Figure 12:
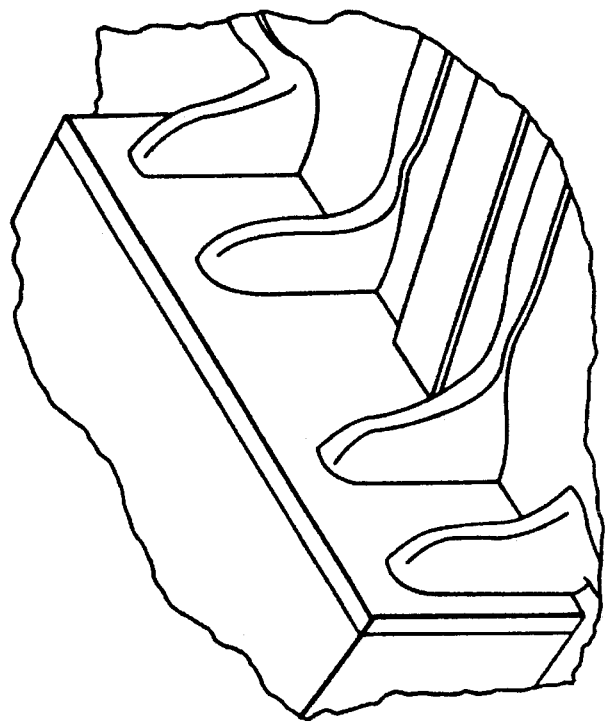
FIG. 12 depicts a perspective view of the slider-suspension assembly of the present invention.

The two solder bumps melt and fuse together in this fraction of a second to form the right angled solder fillet seen on the completed slider-assembly shown in the perspective view of FIG. 12. This figure shows four right angled solder fillets electrically connecting the termination pads of the slider to the etched conductive pattern on the suspension.

Figure 13:
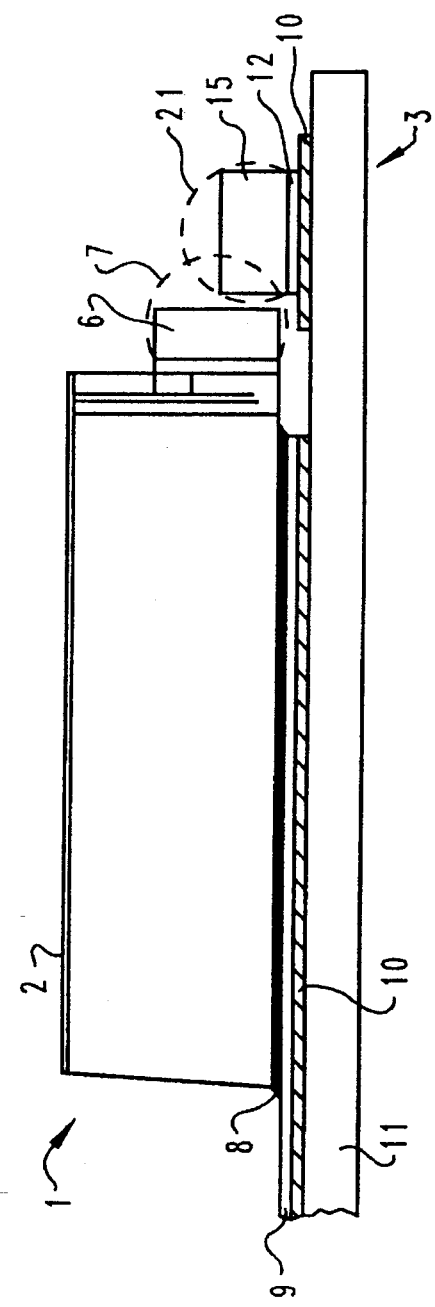
FIG. 13 depicts a process for the assembly of the slider-suspension assembly, according to a preferred embodiment of the present invention.

An alternative preferred embodiment of the present invention is depicted in FIG. 13. Slider 1 has been properly aligned atop the pattern conductive layer 9, 12 and mechanically attached to suspension 3. However, in this embodiment, suspension 3 has been prepared with a selectively flattened solder bump formed on contact pad 12. Upon reflow of solder bump 6 and 15, for example by a laser reflow process, both solder bump 6 and solder bump 15 return to the natural hemispherical shapes 7 and 21. The addition of flattened bump 15 facilitates the forming of the right angled solder fillet joint since both solder bumps expand towards each other upon reflow. This further loosens the tolerance required in aligning slider 1 with suspension 3, while increasing the likelihood of creating a solid electrical connection between the termination pads and the contact pads.

As can be seen from the preferred embodiments, this assembly process relaxes the tolerance required in aligning the termination pads with the contact pads. Rather than require that the aligned pads' solder bumps be in contact prior to reflow, a certain amount of gap existing between the solder bumps can be tolerated in the assembly process when utilizing selectively flattened solder bumps. This is accomplished without sacrificing the quality of the solder fillet joints or slider-suspension assembly yields.

By using a laser beam to reflow the solder bumps, the preferred embodiments of the present invention avoid many of the disadvantages of the prior art. The focused laser beam provides localized heating and thus prevents temperature sensitive components such as an MR head from being exposed to high temperatures. These high temperatures degrade the magnetic properties of such sensitive devices. Moreover, such localized heating produces a stress-free solder joint as neither the slider nor the suspension is subjected to heat exposure. Another significant advantage is that this process eliminates the use of flux in the reflow process. This eliminates the additional processing step required to clean the flux from the slider-suspension assembly subsequent to reflow. Another advantage to the laser reflow process is that because of its rapid heating and cooling, a metallurgically superior solder joint of very fine grain size and low and intermetallics is created. Last, unlike the furnace reflow process, this is a Continuous Flow Manufacturing (CFM) compatible process that can be incorporated into automated assembly lines. While the preferred embodiment utilizes a laser reflow process, it is understood that conventional reflow methods, such as heating in an infrared belt furnace, may also be used to practice the present invention.

The present invention provides a slider-suspension assembly for an information storage system where the read/write transducer termination pads located on the slider have selectively flattened solder alloy bumps formed thereon that are reflowed to solder bumps on the contact pads of a laminated suspension. The soldering is achieved by a flux-less laser reflow process providing local heating of solder and not affecting heat sensitive transducer components such as an MR head, and not requiring any cleaning of flux after soldering. Because of the natural hemispherical expansion of selectively flattened solder bumps upon reflow, the alignment of the slider on the suspension's patterned conductive layer during fabrication does not require that the solder bumps be in contact to make a solid electrically conductive solder fillet joint.

While the invention has been particularly shown and described with reference to a preferred embodiment, it will be understood by those skilled in the art that various changes in form and detail may be made therein without departing from the spirit and scope of the invention.

I claim:

1. An electrical connection comprising:

a termination pad located on a first device;

a contact pad located on a second device; and a solder fillet joint electrically connecting the contact pad to the termination pad formed by heating two adjacent solder bumps, one bump being formed on the termination pad and the other bump being formed on the contact pad, so as to reflow the two solder bumps together to create an electrical connection, wherein one or both solder bumps are selectively flattened such that each selectively flattened solder bump is not formed in the natural hemispherical shape that the solder bump would attain if liquified, and such that the solder bump will expand radially in a direction to make contact with another bump when returning to its natural hemispherical shape upon reflow.

2. A method for the fabrication of a data recording information storage system slider-suspension assembly, the slider having a read and/or write transducer formed thereon with electrical leads terminating at termination pads, and a suspension having a conductive lead structure including conductive contact pads, the method comprising the steps of:

forming a solder bump on each of the termination pads and each of the contact pads, wherein one or more solder bumps are selectively flattened;

placing the slider in contact with the suspension such that the termination pads are properly aligned with the contact pads; and heating the solder bumps so as to reflow the termination pad and contact pad bumps such that they electrically connect, wherein a selectively flattened bump expands radially in a direction to make contact with another bump upon heating.

3. A method according to claim 2, wherein the step of heating is performed by focussing and shining a laser beam at the junction of two adjacent solder bumps.

4. A method according to claim 3, wherein the laser is a YAG laser.

5. A method according to claim 2, further comprising the step of attaching the slider to the suspension by epoxy bonding.

6. A method according to claim 2, wherein all solder bumps are selectively flattened.

7. A method according to claim 2, wherein a solder bump is selectively flattened by using controlled pressure.

8. A method according to claim 2, wherein the information storage system is a magnetic storage system and wherein the slider has a magnetic thin-film transducer formed thereon.

9. A slider-suspension assembly for an information storage system, comprising:

a slider;

a transducer formed on the slider and having electrical leads terminating at termination pads;

a suspension having a conductive lead structure including contact pads, the slider being placed in contact with the suspension such that the contact pads are aligned with the termination pads; and a plurality of solder fillet joints electrically connecting the contact pads to the termination pads, each fillet being formed by heating two adjacent solder bumps formed on pads so as to reflow the two solder bumps together to create an electrical connection, one bump being attached to a termination pad and the other being attached to a contact pad, wherein one or both solder bumps are selectively flattened such that it is not formed in the natural hemispherical shape that the solder bump would attain if liquefied, and such that the bump will expand radially in a direction to make contact with another bump when returning to its natural hemispherical shape upon reflow.

10. A slider-suspension assembly according to claim 9, wherein the termination pad bump is a selectively flattened solder bump.

11. A slider-suspension assembly according to claim 9, wherein the contact pad bump is a selectively flattened solder bump.

12. A slider-suspension assembly according to claim 9, wherein the suspension is formed as a laminated structure comprising a base layer, an insulating layer formed on the base layer, and a patterned conductive layer formed on the insulating layer.

13. A slider-suspension assembly according to claim 12, wherein the base layer is stainless steel, the insulating layer is a polyimide, and the conductive layer is a copper alloy.

14. A slider-suspension assembly according to claim 9, wherein the suspension is formed as a etched flex cable bonded to a stainless steel base layer.

15. A slider-suspension assembly according to claim 9, wherein the transducer is a read/write transducer.

16. A slider-suspension assembly according to claim 9, wherein the transducer is a thin-film magnetic transducer.

17. A slider-suspension assembly according to claim 16, wherein the magnetic transducer is an MR head.

18. A slider-suspension assembly according to claim 16, wherein the magnetic transducer is an inductive transducer.

19. An information storage system comprising:

a storage medium having a plurality of tracks for recording of data;

a slider;

a transducer formed on the slider and having electrical leads terminating at termination pads;

a suspension having a conductive lead structure including contact pads, the slider being placed in contact with the suspension such that the contact pads are aligned with the termination pads, the suspension maintaining the transducer in a closely spaced position relative to the storage medium during relative movement between the transducer and the storage medium; and a plurality of fillet joints electrically connecting the contact pads to the termination pads, each fillet being formed by heating two adjacent solder bumps formed on pads so as to reflow the two solder bumps together to create an electrical connection, one bump being attached to a termination pad and the other being attached to a contact pad, wherein one or both solder bumps are selectively flattened such that it is not formed in the natural hemispherical shape that the solder bump would attain if liquefied, and such that the bump will expand radially in a direction to make contact with another bump when returning to its natural hemispherical shape upon reflow;

actuator means coupled to the suspension for moving the transducer to selected tracks on the storage medium; and means coupled to the suspension lead structure for reading signals transmitted by the transducer representative of data bits recorded in the information storage medium.

20. An information storage system according to claim 19, wherein the coupled means provides signals to the magnetic transducer for writing data bits in the magnetic storage medium.

21. An information storage system according to claim 19, wherein the coupled means receives signals from the transducer that represent data bits recorded in the information storage medium.

22. An information storage system according to claim 19, wherein the transducer is a magnetic transducer formed as a thin-film on the trailing edge of the slider.

23. An information storage system according to claim 22, wherein the coupled means detects resistance changes in a magnetoresistive material residing in the magnetic transducer responsive to magnetic fields representative of data bits recorded in the information storage medium intercepted by the layer of magnetoresistive material.

* * * * *